US008762314B2

(12) United States Patent
Dhurandhar

(10) Patent No.: US 8,762,314 B2
(45) Date of Patent: Jun. 24, 2014

(54) PREDICTIONS USING AGGREGATE INFORMATION

(75) Inventor: Amit Dhurandhar, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 360 days.

(21) Appl. No.: 13/184,000

(22) Filed: Jul. 15, 2011

(65) Prior Publication Data
US 2013/0018830 A1 Jan. 17, 2013

(51) Int. Cl.
*G06N 5/02* (2006.01)
(52) U.S. Cl.
CPC .................................. *G06N 5/02* (2013.01)
USPC .......................................................... 706/46
(58) Field of Classification Search
None
See application file for complete search history.

(56) References Cited

PUBLICATIONS

Tang, Yuchun et al.; "Granular Support Vector Machines for Medical Binary Classification Problems"; 2004; IEEE; pp. 73-78.*
Pedrycz, Witold et al.; "Granular Computing—The Emerging Paradigm"; 2007; Journal of Uncertain Systems, vol. 1, No. 1; pp. 38-61.*
Yao, Yiyu et al.; "Granular Computing"; 2008; Wiley Encyclopedia of Computer Science and Engineering; pp. 1-7.*
Sapp et al., Cascaded Models for Articulated Pose Estimation, ECCV, 2010.
Fleuret et al., Coarse-to-Fine Face Detection, Int. J. Comput. Vision, 2001, 41:85 107.
Munoz et al., Stacked Hierarchical Labeling, ECCV, 2010.
Weiss et al., Structured Prediction Cascades, Proc. AISTATS, 2010.
Petrov, Coarse-to-Fine Natural Language Processing, Ph.D Thesis UC Berkeley, Aug. 12, 2009, Technical Report No. UCB/EECS-2009-116 http://www.eecs.berkeley.edu/Pubs/TechRpts/2009/EECS-2009-116.html.

* cited by examiner

*Primary Examiner* — Jeffrey Gaffin
*Assistant Examiner* — Stanley K Hill
(74) *Attorney, Agent, or Firm* — Scully, Scott, Murphy & Presser, P.C.; Daniel P. Morris, Esq.

(57) ABSTRACT

Predictions of a given predictive model may be improved using aggregate information. A plurality of targets to predict in a given domain may be identified, and may be predicted based on raw data set. Aggregate information associated with the plurality of targets is received, the aggregate information including estimated or actual values at a coarser level of the plurality of targets, and based on the aggregate information, the predicted target values may be improved in prediction accuracy.

18 Claims, 6 Drawing Sheets

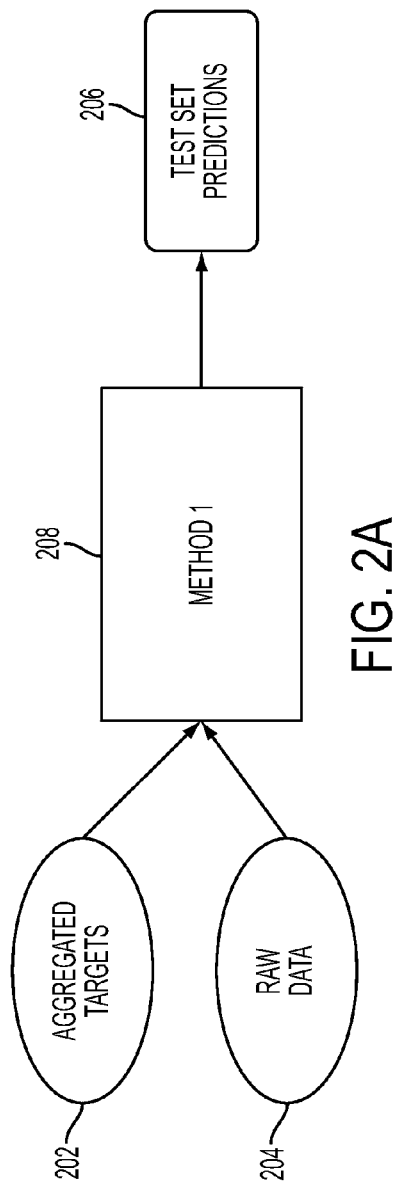
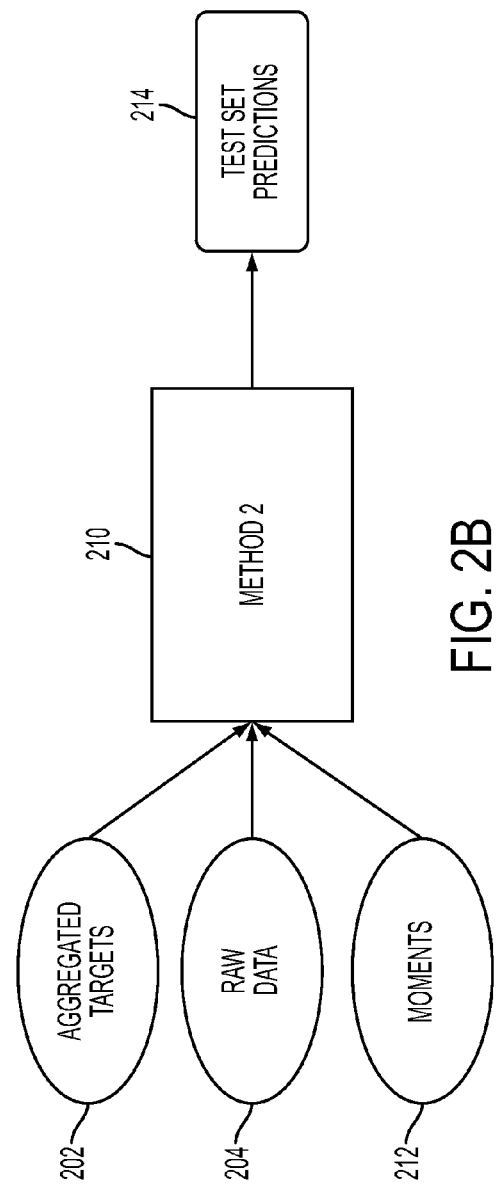

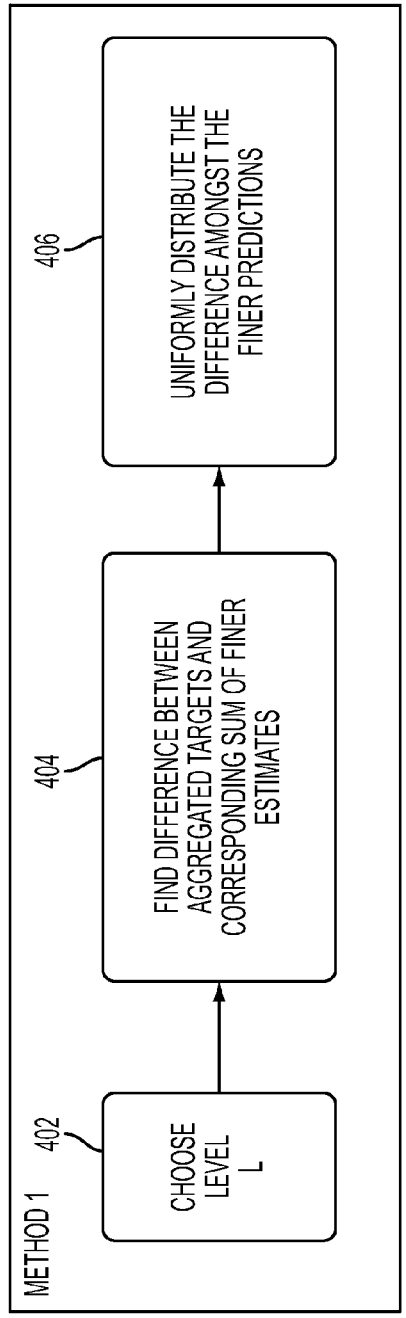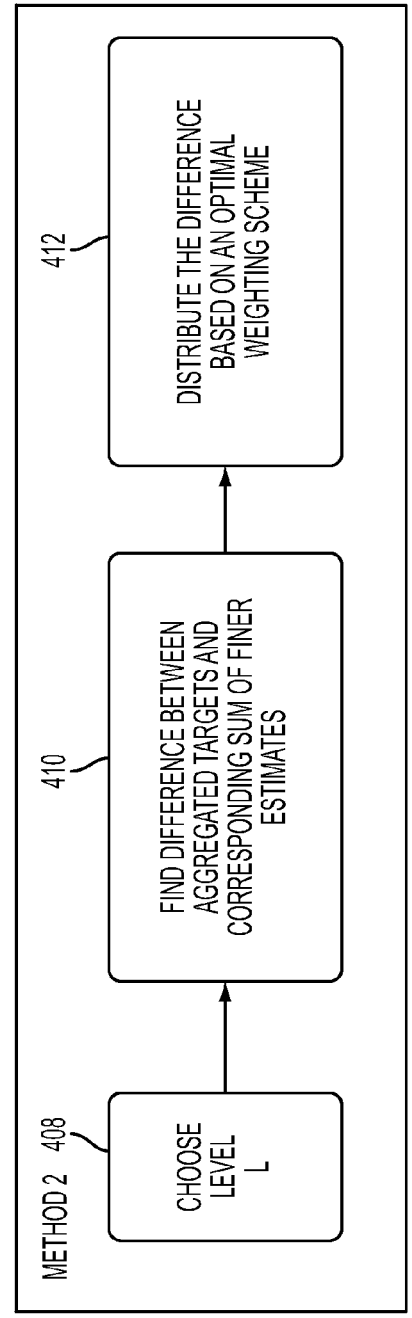

PREDICTIONS USING AGGREGATE INFORMATION

FIELD

The present application generally relates to predictive modeling, and more particularly to improving predictions using aggregate information.

BACKGROUND

In B. Sapp, A. Toshev, and B. Taskar. *Cascaded models for articulated pose estimation*. In ECCV, 2010; F. Fleuret and D. Geman. *Coarse-to-ne face detection*. Int. J. Comput. Vision, 41:85 107, 2001; J. B. D. Munoz and M. Hebert. *Stacked hierarchical labeling*. In ECCV, 2010.; and D. Weiss and B. Taskar. *Structured prediction cascades*. In Proc. AISTATS, 2010, the authors improve performance of certain computer vision tasks (viz. pose estimation, face recognition, etc.) using coarser information. In P. Slay. *Coarse-to-ne natural language processing*. Ph.D Thesis UC Berkeley, 2009., coarser information is used to improve the performance of neuro-linguistic programming (NLP) models. The existing work, however, mainly considers or uses the coarser information in classification and the structured prediction setting. No work is known that uses the coarser information for the regression setting.

BRIEF SUMMARY

A method for improving predictions of a given predictive model using aggregate information, in one aspect, may include identifying a plurality of targets to predict in a given domain. The method may also include receiving raw data set for predicting a plurality of values associated respectively with the plurality of targets in the given domain and predicting the plurality of values, and receiving aggregate information associated with the plurality of targets. The aggregate information includes estimated or actual values at a coarser level of the plurality of targets. The method may further include improving the predicted values of the plurality of targets based on the aggregate information.

A system for improving predictions of a given predictive model using aggregate information, in one aspect, may include a module operable to execute on a processor and further operable to identify a plurality of targets to predict in a given domain. The module may be further operable to receive raw data set for predicting a plurality of values associated respectively with the plurality of targets in the given domain and predicting the plurality of values. The module may be yet further operable to receive an aggregate information associated with the plurality of targets, the aggregate information including estimated or actual values at a coarser level of the plurality of targets. The module may be still further operable to improve the predicted values of the plurality of targets based on the aggregate information.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE SEVERAL VIEWS OF THE DRAWINGS

FIG. 2A illustrates a method in one embodiment of the present disclosure for using aggregate information for improving prediction.

FIG. 2B shows an enhanced method in one embodiment of the present disclosure for using aggregate information for improving prediction.

FIG. 4A shows a method that uses uniform distribution.

FIG. 4B shows a method that uses weighting scheme in one embodiment of the present disclosure.

DETAILED DESCRIPTION

Figure 1A:
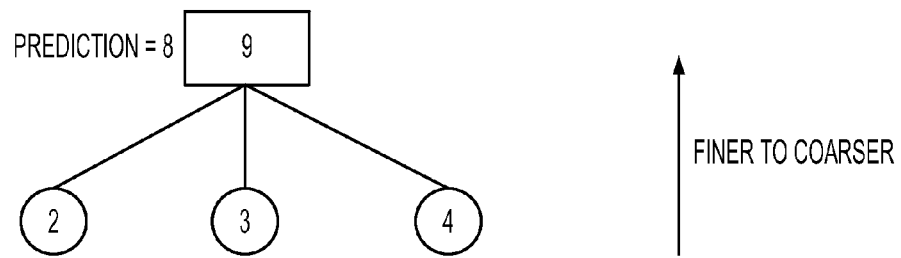
FIG. 1A graphically illustrates using coarser estimates to improve finer predictions.

In one embodiment of the present disclosure, a method and system are presented that improve the quality of predictions of a given predictive model using available or estimated aggregate information. Such a system can be used in various domains such as in supply chain for production planning, in census data to estimate missing entries, in bioinformatics for applications involving microarray data, in time dependent applications to capture drift, and others. In general, such a system can be used where data, e.g., accurate data, may be available at coarser levels of granularity.

In one aspect, the technique of the present disclosure uses aggregate information, and if available, distributional information to enhance finer predictions. The method and system may use exact or approximate aggregate information to improve available predictions. The method and system may use distribution information to further enhance predictive accuracy with an optimal weighting scheme. The method and system may choose optimal level if aggregate information is available at multiple levels. For instance, if aggregate information is available at multiple levels it chooses the optimal level of granularity based on a custom criterion. If aggregate information is not available the system may build models at various levels and estimate aggregate information. For instance, if aggregate information is unavailable it builds models at various levels of granularity and chooses the optimal level and model using the above mentioned criterion.

The method and system in the present disclosure in one embodiment may employ coarser information to improve performance of models in certain computer vision tasks (viz. pose estimation, face recognition, and others). In the present disclosure, a regression setting is presented, for instance, in which predictions may be improved at a finer level of granularity using aggregate information. The method and system may improve predictions of a given predictive model using aggregate information with respect to the quadratic loss function.

A scheme of the present disclosure in one embodiment use the aggregate information to improve finer predictions, by using a methodology of choosing the appropriate aggregation granularity and then using this information in conjunction with target distribution information if available, to improve predictions at the level that one cares about. If aggregate information is not available, a methodology is used to estimate this information and then use this information as described before.

In domains such as consumer products or manufacturing amongst others that warrant the prediction of a continuous target, in addition to the usual set of explanatory attributes such as pressure, temperature, and others, in complex instrumented industries, or price, point-of-sales, and others, in consumer products industry; there may also exist exact (or approximate) estimates of aggregated targets, which are the sums of disjoint sets of individual targets that are being predeicted. The present disclosure may provide a way of using these aggregated targets which are a coarser piece of information to improve the quality of predictions of the individual targets. For instance, given predictions from any regression model of the target on the test data, the present disclosure may provide a method for improving these predictions in terms of mean squared error, given exact (or accurate enough) information of the aggregated targets. These estimates of the aggregated targets may be readily available or obtained—through multilevel regression, for example, at different levels of granularity. Further, a criterion may be provided for choosing the appropriate level. Moreover, in addition to estimates of the aggregated targets, if the exact (or approximate) estimates of the mean and variance of the target distribution are available, then based on a general strategy, the present disclosure may provide an optimal way of incorporating this information so as to further improve the quality of predictions of the individual targets.

Briefly, a target in this disclosure refers to the attribute that is being predicted.

In many industries such as consumer products, manufacturing, and others where there is a supply chain with a manufacturer who produces and sends goods to various distribution centers (DC) who further redistribute the goods amongst the stores, it is observed that certain delay from the time that the goods are produced to finally the stores receiving the goods. Thus, as time goes by, finer and finer pieces of information become available. From a strategic point of view, however, the manufacturer may want to know initially how his goods are going to be distributed among the various DC and stores with as much accuracy as possible. Based on his past experience, he may be able to come up with predictions of how much each store or DC might order. In this example, a "target" is a prediction of how much each store might order. A method is provided in the present disclosure that improves predictions (of the target) obtained based on past observations, by using estimates or actual values of the target at a coarser level of granularity for the current time period, e.g., based on knowing how much total amount is going to be distributed for the current time period. Thus, in this example "aggregated targets" would be the aggregation of each of the predicted targets, i.e., how much a manufacturer produces or how much a DC receives if one is predicting at the store level. Moreover, if one is predicting at the store level, the information available at the manufacturer and DC level accounts for information being available at multiple "coarser levels of granularity" or at multiple "aggregation granularities", where information at the manufacturers level (i.e., how much he produces) is the coarsest piece of available information while information at the DC level is finer than information at the manufacturer level but still coarser than store level information which one is interested in predicting. In other words, both the DC and manufacturer level information would be considered as aggregated targets with the corresponding information being available at multiple (in this case 2) aggregation granularities.

If there exists the true values (or accurate estimates) at a particular level of granularity, they may be summed to get estimates at a coarser level of granularity. For example, if there are predictions for a coarser level of granularity and true values at a finer level, the predictive accuracy at the coarser level may be improved by aggregating the finer estimates and using them as predictions. This is shown in FIG. 1A. FIG. 1A graphically illustrates using coarser estimates to improve finer predictions. For instance, using the manufacturer/supplier example above, if there true values are predicted for the amount distributed to each of the downstream stores or DCs, the prediction accuracy for the total amount of goods the manufacturer would distribute may be improved by aggregating those true values and using them as predictions.

However, if there is the converse problem then the solution is not obvious. What is meant by this is that, if one knew coarser values and were trying to improve the quality of the predictions at a finer level, it is not clear if there is in fact a provable way of improving the accuracy. Using the above example again, even if the total amount of distribution by the manufacturer is known, it might not improve the predicted values for the amount distributed to each of the downstream stores or DCs. In the present disclosure, given predictions of the target for the current time period based on past experience (e.g., the output of a regression model or something else), the method and system of the present in one embodiment may improve but not worsen, the quality of these predictions using aggregated target information, i.e., using information about the sums of different sets of targets being predicted.

Figure 1B:
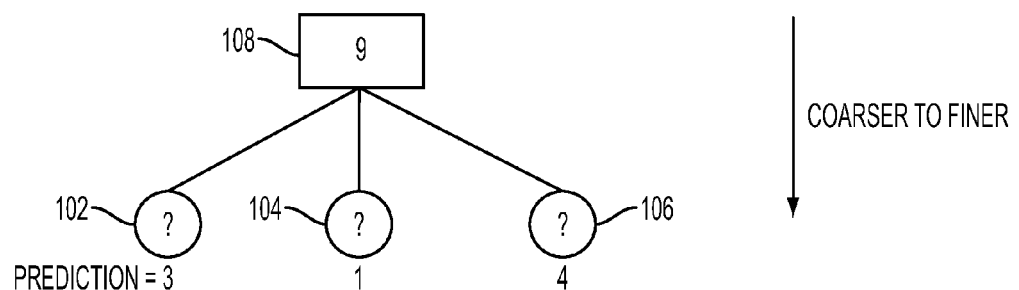
FIG. 1B graphically illustrates using coarser estimates to improve finer predictions.

FIG. 1B graphically illustrates using coarser estimates to improve finer predictions. Consider FIG. 1B, where there are predictions for the three datapoints (denoted by circles) 102, 104, 106, the sum of the true targets is 9 and the method of the present disclosure in one embodiment uses this value 9 to improve the accuracy of the predictions. For instance, each of the circles 102, 104, 106 may represent amount distributed to a store or a DC. The square 108 may represent the manufacture's amount of distribution to those stores, or another intermediary distribution point that distribution to those stores or DCs. In another aspect, even if the value 9 is not the exact sum of the targets but an "accurate enough" estimate, the method of the present disclosure may still guarantees that the new predictions obtained by its application will be no less accurate than the old predictions.

Such a method can be used not only for supply chain kind of problems but in any problem where good quality aggregate information is available and one would like to predict at a finer level of granularity. A good example of this may be census data where information at a national or state level may be more reliable than data at a city or county level where there might be missing data since some people may not turn in the survey. In this example, a national or state level represent coarser level of granularity; city or county level represent finer level of granularity. The coarser levels are determined based on the what one wants to predict and what information is available. Hence, if one is predicting at the city level and has at hand state and national level data, then data at these two levels would be coarser information. Predicting the missing values can be done more effectively knowing the aggregate information. If aggregate information is available at multiple levels of granularity with varying accuracy, choosing the right level of granularity so as to maximize the improvement in predictions is not obvious. For instance, an example of multiple levels in this example may be: a national level, region level, state level, county level, town level, city level in the order of coarse to finer level of granularity. In this disclosure in one embodiment, a criterion is provided for choosing an optimal level of granularity from which to use the aggreate information for improving the prediction accuracy of the target.

Information at a coarser level of granularity may not always be available as is the case in standard machine learning settings, where we have data only at the level we want to predict. In this case, the method of the present disclosure in one embodiment could build regression models on the historical data by aggregating it at various levels of granularity and use the "best" model to give estimates of the aggregated targets at that level of granularity. These estimates can then be used in conjunction with the method to improve the predictions at the finest level of granularity. The "best" model is not necessarily the most accurate model amongst those built at the various coarser levels of granularity since, the amount of improvement in predictive accuracy at the finest level by using method of the present disclosure is a function of both the accuracy of the models and the level of granularity they are built at. Consequently, the present disclosure in one embodiment provides an algorithm for choosing the model that is most likely to elevate the accuracy of the predictions of the target. In the trivial case, the best model might be the model at the finest level, which would suggest that aggregating the data isn't too helpful. An algorithm of this nature however, can be used for a wide variety of machine learning tasks such as predicting time series data where the aggregate models would predict the potential drift, if any, over time and this drift if accurately captured can assist in improving individual predictions. Another example is microarray data which is sparse and hence aggregating it can help predictive accuracy.

Another embodiment of the present disclosure enhances the method of using aggregated targets to improve finer predictions to further use the distribution information, e.g., the mean and variance information of the predicted target, if available. In particular, the optimal weighting is identified based on the mean and variance of the distribution of the target that will maximize the impact on the quality of the predictions in expectation. If this information is not available one may estimate these moments from the data, if deemed appropriate. The input-output of the original method and the enhanced method are pictorially depicted in FIGS. 2A and 2B.

FIG. 2A illustrates a method in one embodiment of the present disclosure. The method 208 shown in FIG. 2A takes as input the raw data 202 and the aggregated targets 204 (exact or estimates) at a single or multiple levels and outputs the test predictions 206. The raw data 202 here refers to historical data at the level we want to predict. For example, in the consumer products context the explanatory attributes would be product name, type, price, etc. and the target would be quantity. Aggregated targets 204 refer to the sum or aggregated values of the targets that are to be predicted. If these aggregated targets are available at multiple coarser levels viz. manufacturer and DC level in the supply chain example; then we say that we have information available at multiple aggregation granularities.

FIG. 2B shows an enhanced method in one embodiment of the present disclosure. The method 210 represented in FIG. 2B takes in addition the moment information 212 of the target distrbution to give further improved predictions 214. Target distribution refers to the mean and variance associated with the true target value.

Both methods improve predictions at a finer level of granularity using aggregate information. The predictions can be further improved if the mean and variance of the target is accurately known. Based on the proofs of these previous results i.e. ways to improve predictions given aggregate information at a particular aggregation granularity, in cases where there may be estimates at multiple (coarser) levels of granularity, the present disclosure provides a criterion that chooses a level of granularity that using the method is most likely to maximize the improvement in the quality of predictions at the finer level of granularity. In traditional settings where these estimates may not be available apriori, the present disclosure suggests an algorithm that builds regression models at multiple levels of granularity on the historical data in order to obtain the corresponding estimates. Then the level is decided using the criterion and hence the corresponding regression model is chosen that will be used to improve the quality of predictions obtained from a regression model built at the (finer) level of granularity.

Trickling Down Aggregates A method is described to trickle down aggregate information in order to improve finer predictions. If estimates of the aggregated target are available at multiple (coarser) levels of granularity, based on the previous results, a criterion is suggested to choose the level that using the method is most likely to maximize the improvement in the quality of predictions at the (finest) level of granularity being predicted. If these estimates are not available, an algorithm is suggested for obtaining them and using the criterion to decide the appropriate level.

The following terminologies are used in the present disclosure.

Figure 3A:
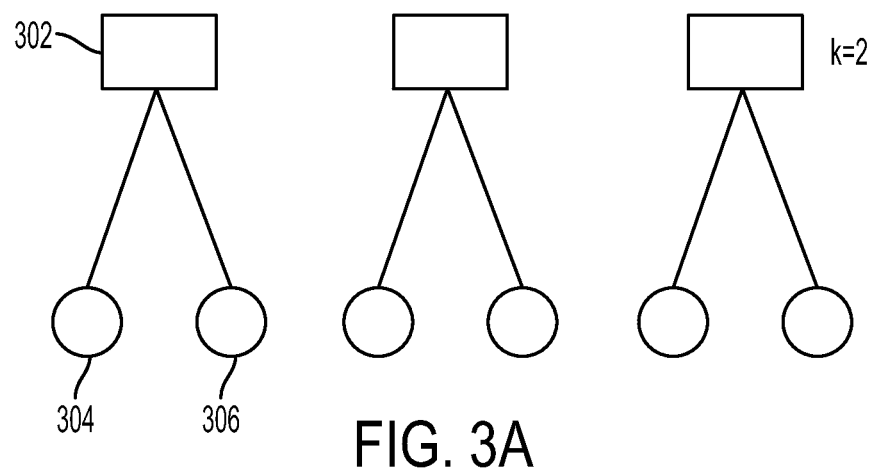
FIG. 3A illustrates an example of aggregation granularity that is 2.
Figure 3B:
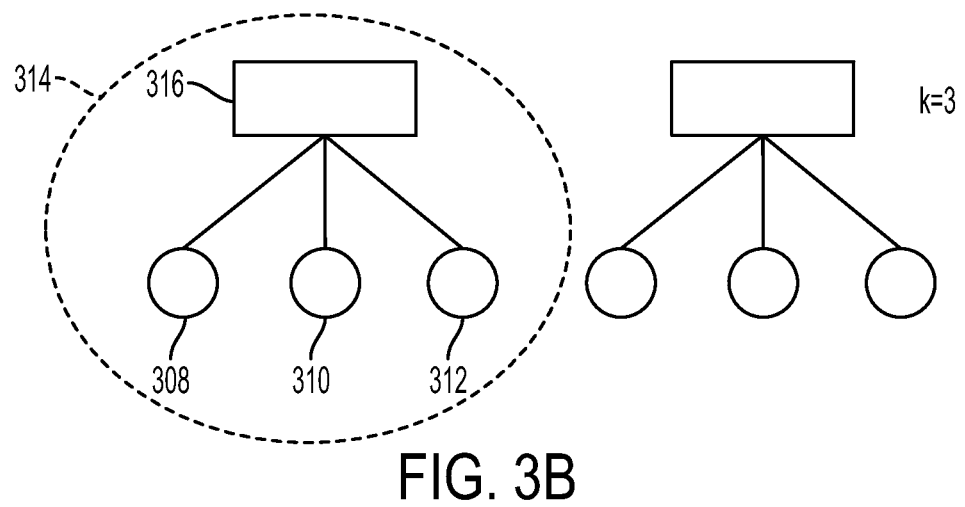
FIG. 3B illustrates an example of aggregation granularity that is 3.

Aggregation granularity: aggregation granularity k is defined as the number of values at the finest level of granularity (i.e., at the level of the original dataset) summed together to form coarser estimates. For example, in FIG. 3A, the aggregation granularity is 2 since, if the circles represent datapoints at the finest level then the rectangles which denote coarser estimates are sums of pairs of these circles. Similarly, in FIG. 3B, the aggregation granularity is 3, since the rectangles are sums of triplets of the circles. For example, circles 304, 306 might represent the predicted amount of goods shipped or distributed to retail stores (each circle an amount to a retail store); a square 302 might represent represent the aggregated estimate for the amount shipped to distributed all the retail stores.

Aggregated targets: These are sums of the individual targets in each set where the sets form a partitioning of the individual targets in the dataset. Note that the rectangles in FIG. 3A and 3B would denote aggregated targets if the circles denoted individual target values. For example, an aggregated target is shown at 316 of individual targets 308, 310, 312, in a set 314.

Method and Results An informal description of the method in one embodimnet where the aggregation granularity is k is as follows. First sum up the various sets of k predictions corresponding to the aggregated targets which are already available or obtained by techniques described above, such as regression, time series, and/or others. For instance, ridge regression technique may be used to predict the target and the aggregated targets if not available. With this, there is each of the aggregated targets associated with its own sum of k predictions. Now subtract each of these sums from the corresponding aggregated targets which produces the corresponding differences. Then divide each of these differences by k and uniformly add them to the corresponding k predictions. Thus, in the example shown in FIG. 1B, where 9 is the aggregated target with 3, 1 and 4 being the predictions, first add 3, 1 and 4 which produces 8, then subtract 8 from 9 which results in 1, and then finally add 1/3 to the original predictions which would produce 10/3, 4/3 and 13/3 as the new predictions. If additional information regarding the distribution (mean and variance) of the target is available, then rather than distributing the differences uniformly amongst the predictions an optimal convex weighting scheme is derived.

With this, four results are presented which includes a formal description of the method described above.

In Lemma 1 it is shown that knowing the true or exact values of the aggregated targets and predictions of the individual targets, the method can produce new modified predictions that are not worse in terms of mean squared error (MSE) than the original predictions.

In Theorem 1 it is shown that knowing approximate values (within a certain error bound) of the aggregated targets and predictions of the individual targets, the method can produce new modified predictions that are not worse in terms of MSE than the original predictions.

Lemma 2 shows that even if it is known the exact values of the aggregated targets and have predictions of the individual targets, and if the method is altered slightly where the differences are distributed non-uniformly amongst the predictions then the claim made in 1 no longer holds. In other words, the MSE of the new predictions might be greater than the old predictions if all the differences are not distributed uniformly.

Lastly, in lemma 3 it is shown that in addition to knowing the aggregated targets and having predictions of the individual targets, if the mean and variance of the target distribution is also known, then optimal weights can be derived for distributing the differences which may be non-uniform.

Lemma 1 Consider two sets of N real numbers $X=\{x_1, x_2, \ldots, x_N\}$ and $\overline{X}=\{\overline{x}_1, \overline{x}_2, \ldots, \overline{x}_N\}$ (estimates). Let $A=\{a_1, \ldots, a_m\}$ and $\overline{A}=\{\overline{a}_1, \ldots, \overline{a}_m\}$ such that if, k is the aggregation granularity, $l_i=\min(ik,N)-(i-1)k$, $$m = \left\lceil \frac{N}{k} \right\rceil, \text{ then } a_i = \sum_{j=(i-1)k+1}^{\min(ik,N)} x_j \text{ and } \overline{a}_i = \sum_{j=(i-1)k+1}^{\min(ik,N)} \overline{x}_j.$$

If $\epsilon_i = a_i - \overline{a}_i$ then, $$\sum_{j=1}^{N} (x_j - \overline{x}_j)^2 \geq \sum_{j=1}^{N} (x_j - \hat{x}_j)^2 \text{ where } \hat{x}_j = \overline{x}_j + \frac{\epsilon_{\lceil j/k \rceil}}{l_{\lceil j/k \rceil}}$$

The result below shows that even if the values at the coarser level of granularity are not known exactly but with "some" error, they still can be used to enhance accuracy.

Theorem 1 Consider two sets of N real numbers $X=\{x_1, x_2, \ldots, x_N\}$ and $\overline{X}=\{\overline{x}_1, \overline{x}_2, \ldots, \overline{x}_N\}$ (estimates). Let $A=\{a_1, \ldots, a_m\}$ and $\overline{A}=\{\overline{a}_1, \ldots, \overline{a}_m\}$ where if k is the aggregation granularity, then $l_i=\min(ik,N)-(i-1)k$, $$m = \left\lceil \frac{N}{k} \right\rceil, a_i = \sum_{j=(i-1)k+1}^{\min(ik,N)} x_j \text{ and } \overline{a}_i = \sum_{j=(i-1)k+1}^{\min(ik,N)} \overline{x}_j.$$

If $\epsilon_i = a_i - \overline{a}_i$ and $\delta_i \in [0, 2\epsilon_i]$ then, $$\sum_{j=1}^{N} (x_j - \overline{x}_j)^2 \geq \sum_{j=1}^{N} (x_j - \hat{x}_j)^2 \text{ where } \hat{x}_j = \overline{x}_j + \frac{\delta_{\lceil j/k \rceil}}{l_{\lceil j/k \rceil}}$$

With respect to the formulation in the present disclosure, A denotes the aggregated targets, A bar denotes approximations to the aggregated targets, $a_i$ denotes a particular aggregated target, $a_i$ bar denotes an approximation to a particular aggregated target, X denotes the true values of the target and X bar denotes the predicted values.

Lemma 2 Consider two sets of N real numbers $X=\{x_1, x_2, \ldots, x_N\}$ and $\overline{X}=\{\overline{x}_1, \overline{x}_2, \ldots, \overline{x}_N\}$ (estimates). Let $A=\{a_1, \ldots, a_m\}$ and $\overline{A}=\{\overline{a}_1, \ldots, \overline{a}_m\}$ where if k is the aggregation granularity, $l_i=\min(ik,N)-(i-1)k$, $$m = \left\lceil \frac{N}{k} \right\rceil, \text{ then } a_i = \sum_{j=(i-1)k+1}^{\min(ik,N)} x_j \text{ and } \overline{a}_i = \sum_{j=(i-1)k+1}^{\min(ik,N)} \overline{x}_j.$$

If $\epsilon_i = a_i - \overline{a}_i$ and $$\forall i \sum_{j=(i-1)k+1}^{\min(ik,N)} \alpha_j = 1$$

where $\forall j \; \alpha_j \geq 0$ with all $\alpha_j$ (for any i) not being equal then there always exists a X and $\overline{X}$ such that, $$\sum_{j=1}^{N} (x_j - \overline{x}_j)^2 \leq \sum_{j=1}^{N} (x_j - \hat{x}_j)^2 \text{ where } \hat{x}_j = \overline{x}_j + \alpha_j \epsilon_{\lceil j/k \rceil}$$

Lemma 3 Consider two sets of N real numbers $X=\{x_1, x_2, \ldots, x_N\}$ and $\overline{X}=\{\overline{x}_1, \overline{x}_2, \ldots, \overline{x}_N\}$ (estimates). Let $A=\{a_1, \ldots, a_m\}$ and $\overline{A}=\{\overline{a}_1, \ldots, \overline{a}_m\}$ where if k is the aggregation granularity, $l_i=\min(ik,N)-(i-1)k$, $$m = \left\lceil \frac{N}{k} \right\rceil, \text{ then } a_i = \sum_{j=(i-1)k+1}^{\min(ik,N)} x_j \text{ and } \overline{a}_i = \sum_{j=(i-1)k+1}^{\min(ik,N)} \overline{x}_j.$$

If $\epsilon_i = a_i - \overline{a}_i$ and it is known that X:D where $\mu$ is the mean of the distribution D (i.e. E[X]) and $\sigma^2$ is the variance then, $$E\left[\sum_{j=1}^{N} (x_j - \overline{x}_j)^2\right] \geq E\left[\sum_{j=1}^{N} (x_j - \hat{x}_j)^2\right] \quad (1)$$

where $\hat{x}_j = \overline{x}_j + \alpha_{\lceil j/k \rceil}^{(jmodl_{\lceil j/k \rceil}+1)} \epsilon_{\lceil j/k \rceil}, \alpha_{\lceil j/k \rceil}^{(jmodl_{\lceil j/k \rceil}+1)} \geq 0$ and $$\sum_{i=1}^{l_p} \alpha_p^{(i)} = 1 \; \forall \; p \in \left\{1, \ldots, \left\lceil \frac{N}{k} \right\rceil\right\}.$$

The optimal alphas that minimize the expectation on the right side of the inequality in equation (1) are given by, $$\alpha_p^{(i)} = \frac{1}{l_p \epsilon_p^2}[l_p \epsilon_p(\mu - \overline{x}_{i+k(p-1)}) - (2l_p - 1)(\sigma^2 + \mu^2)]; i \neq l_p$$

$$\alpha_p^{(l_p)} = \frac{1}{l_p \epsilon_p^2}[(2l_p - 1)(l_p - 1)(\sigma^2 + \mu^2) - l_p \epsilon_p((l_p - 1)\mu + \overline{x}_{i+k(p-1)} - a_p)]$$

In the formulation above, the alphas represent the fraction of the corresponding difference between the aggregated target and the sum of the present disclosure's predictions that should be added to the available predictions of the target in order to get new and possibly improved predictions.

A high level description of the methods formally described in lemma 1 and in lemma 3 are shown in FIGS. 4A and 4B. FIG. 4A shows a method that uses uniform distribution. At 402, a level is chosen. At 404, the difference between aggregated targets and corresponding sum of finer estimates are determined. At 406, the difference is uniformly distributed among the finer predictions. FIG. 4B shows a method that uses weighting scheme. At 408, a level is chosen. At 410, the difference between aggregated targets and corresponding sum of finer estimates are determined. At 412, the difference is distributed based on an optimal convex weighting scheme based on the formulae provided in lemma 3.

Choosing between Multiple levels The reduction in MSE by applying the method of the present disclosure is a function of the aggregation granularity and the accuracy of the estimates of the aggregated targets. In particular, the smaller the aggregation granularity and the lower the error the more significant the improvement. However, if there are estimates of the aggregated targets at multiple levels of granularity with varying accuracy, in the general case, it is not clear as to which level will lead to the most improvement. For example, at k=2 there might be an error of 0.2 and at k=3 there might be an error of 0.15. In this case, it is not clear whether to use the estimates of the aggregated target at level 2 or level 3. Note that if the error at level 3 was more than that at level 2 then the choice is obvious and we would choose level 2. Hence, in choosing the appropriate level there is a trade-off between the aggregation granularity and the error of the estimates of the aggregated targets.

Criterion: If k is the aggregation granularity and $MSE_k$ denotes the mean squared error of the aggregated targets at aggregation granularity k then the level that is most likely to lead to maximum improvement in the predictions of the target is given by, $$L = \min_k \arg\min_k k MSE_k \quad (2)$$

To better understand this consider the above supply chain example. In this case, we want to predict at the store level but have information at two coarser levels that is at the DC level and at the (coarsest) manufacturer level. In this case if we build regression models at these two levels and get the MSE of the predictions as 0.2 at the DC level and 0.3 at the manufacturer level, then based on the above criterion we would choose the model at the DC level. This is so since by Equation (2), at the DC level the value of the objective function is 2*0.2=0.4 while at the manufacturer level it is 3*0.3=0.9 and hence the value of the objective function is lower at level 2 which is the DC level.

If there are multiple k values with the same value of the objective the present disclosure in one embodiment chooses the minimum k. If L=1 is the answer then that means that the aggregated targets at coarser levels will most likely not help in improving the predictive accuracy.

The technique of the present disclosure in one embodiment provides a criterion that in a traditional machine learning setting can be used to choose a regression model at a certain level of aggregation based on the training set followed by using this model to estimate aggregated targets on the test set, which then can be used to improve predictions of the target on the test set. An algorithm for the same is described below.

Algorithm for choosing level/model in traditional settings: In a standard machine learning setting where there is a training and a test set, M models may be trained one for each of the M levels of aggregation on the training set and use the criterion mentioned in equation (2) to decide the best level and the corresponding model to be used to improve the predictions on the test set (i.e., of a model built at k=1). Note that as before the M levels of aggregation are multiple coarser levels for the same finest level. If the test set size is N, potentially M could be N. The test set here implies new predictions that may be gathered over time but are not part of the historical data on which the regression models have been trained. Models may be built to have upto a certain level for the following reasons: 1) the corresponding dataset sizes (due to aggregation) at or beyond that level or aggregation granularity may be insufficient to train a model and 2) beyond a certain aggregation granularity even if it is known the exact values of the aggregated targets at those levels, the enhancement they produce in the quality of predictions is minuscule. From experiments, building models beyond k=10 may not be necessary.

Figure 5:
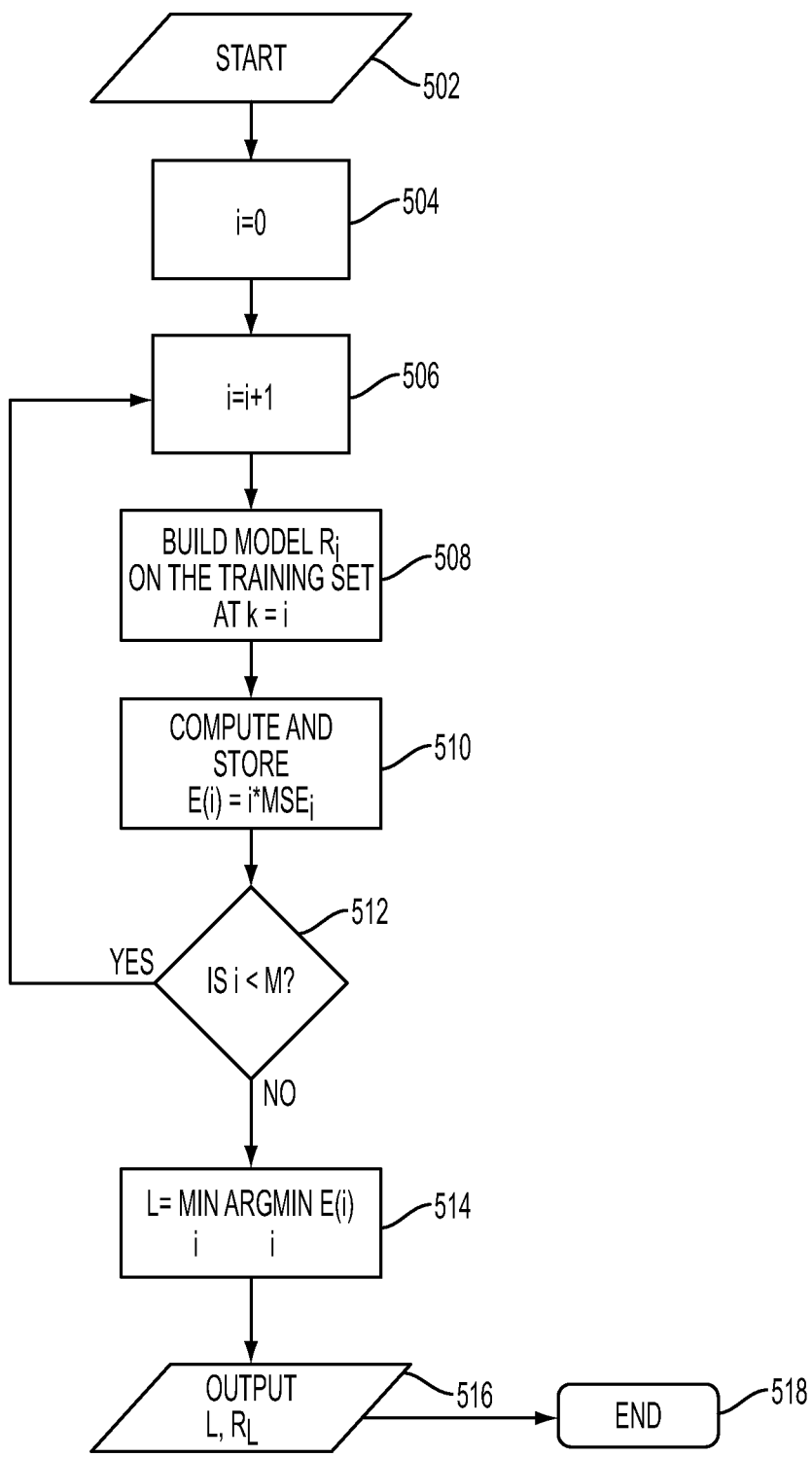
FIG. 5 illustreates an algorithm in one embodiment for choosing the appropriate level and the corresponding regression function.

A flowchart describing the algorithm to decide the level and model is given in FIG. 5. FIG. 5 illustrates an algorithm for choosing the appropriate level and the corresponding regression function given that models are built at M levels, i.e., from k=1 to k=M in one embodiment of the present disclosure. As per the flowchart, the model $R_L$ is used to predict aggregated targets on the test set. The estimates produced by $R_L$ can then be used to improve the predictions of the model built to predict the target by using the strategy described above. Note that the strategy changes depending on if in addition to these estimates the technique of the present disclosure also use the estimates (or actuals if available) of the moments of the target distribution.

At 502, the algorithm starts. At 504, an index i is set to 0. At 506, the index i is incremented. At 508, a regression model $R_i$ is built, for example, on the training set at k=i. The regression model $R_i$ estimates the aggregated target at level k.

At 510, the estimation error associated with the estimated aggregated target determined by the regression model $R_i$ is computed.

At 512, it is determined whether more aggregated targets should be estimated at different levels, for instance, by testing whether i is less than M. If yes, the algorithm proceeds to 506. If the aggregated targets have been computed for all desired levels, at 514, the appropriate level to use for improving the target prediction is selected, for instance, using the formulation shown at 514. At 516, the determined level L and the regression model $R_L$ is returned. At 518, the algorithm ends.

The technique of the present disclosure may be applied to different domains for instance as follows.

Supply Chain Dataset: This dataset is obtained from an actual manufacturer and contains data at two levels namely; at the (finer) distribution center (DC) level and at the (coarser) manufacturer level. The goal is to predict the inventory position at a DC given past inventory positions and other attributes such as age of the inventory and product type (viz. egg beaters, pasta, etc.). In addition to this, there is also information about the total amount shipped (aggregate information) from the manufacurer to meet the demands of the DC. Hence, in this case algorithm in FIG. 5 need not be used since there is already aggregate information. Results in lemma 1 and lemma 3 may be used (estimating the moments from the data). In the dataset there are 7 distribution centers and the data was collected daily for about a year (dataset size is 357).

Chip Manufacturing Dataset: In the chip manufacturing industry predicting speed of the wafers (collections of chips) accurately ahead of time can be crucial in choosing the appropriate set of wafers to send forward for further processing. Eliminating faulty wafers can save the industry a huge amount of resources in terms of time and money. This dataset has 175 features where, the wafer speed is one of them. The other features are a combination of physical measurements and electrical measurements made on the wafer. The dataset size is 2361. In this case, aggregate information is unavailable and hence, the algorithm in FIG. 5 is used to estimate the aggregated targets, which can be viewed as estimating drift in the time series.

Oil Production Dataset: Oil companies periodically launch production logging campaigns to get an idea of the overall performance as well as to assess their individual performance at particular oil wells and reservoirs. These campaigns are usually expensive and laden with danger for the people involved in the campaign. Automated monitoring of oil production equipment is an efficient, risk free and economical alternative to the above solution. The dataset is obtained from a major oil corporation. There are a total of 9 attributes in the dataset. These attributes are obtained from the sensors of a 3-stage separator which separates oil, water and gas. The 9 attributes are composed of 2 measured levels of the oil water interface at each of the 3 stages and 3 overall attributes. In this example, the target is Daily production which indicates the amount of oil produced every day at the well. The dataset size is 992. In this case too, aggregate information is unavailable and hence, the algorithm in FIG. 5 is used to estimate the aggregated targets.

Figure 6:
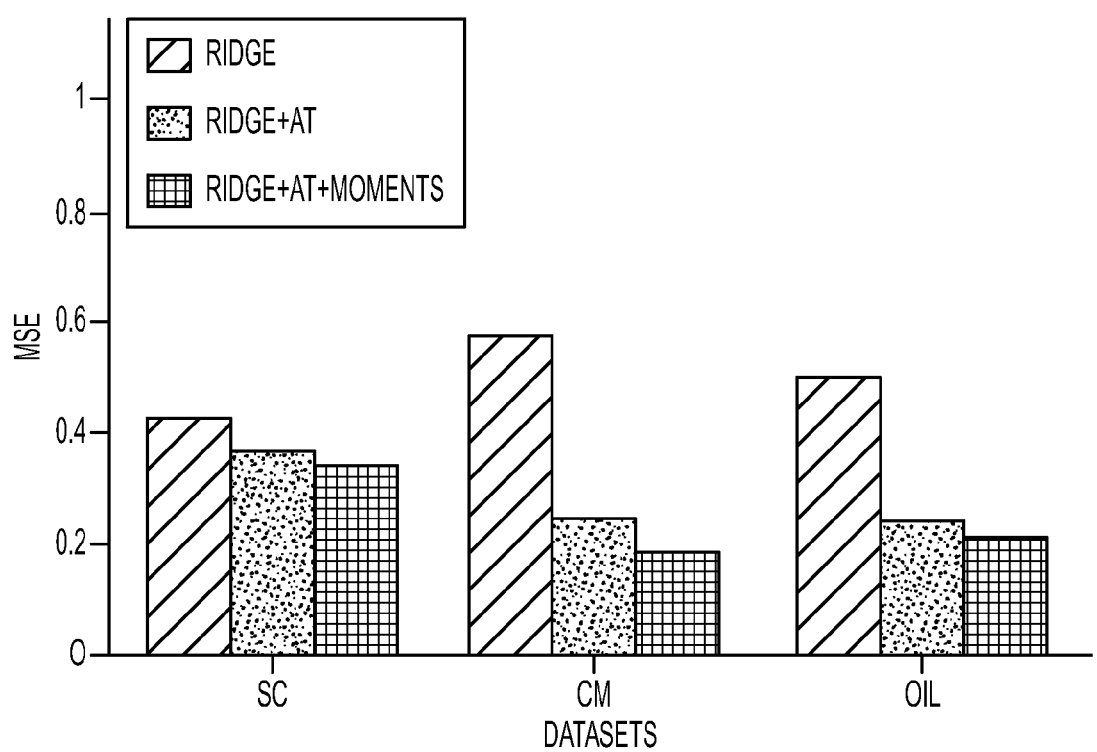
FIG. 6 shows comparison of three variants on example datasets.

Observations: FIG. 6 shows comparison of three variants on the above example datasets. SC stands for a Supply Chain dataset, CM stands for a chip manufacturing dataset and Oil stands for an Oil production dataset. AT implies aggregated target information. In FIG. 6, the behavior of the three variants is observed, namely: 1) ridge regression (R), 2) ridge regression using (actual or estimated) aggregated targets (R+A) and 3) ridge regression using (actual or estimated) aggregated targets alongwith estimated moments (R+A+M), on the three datasets. First it is shown that the performance improves consistently from R to R+A and from R+A to R+A+M. However, the extent of the improvement differs in the 3 cases. A possible reason for the improvement from R+A to R+A+M being more significant on CM than on the other datasets could be that the larger dataset size leads to more accurate estimates of the moments as compared to the other datasets. The improvement from R to R+A is more pronounced on CM and Oil than on SC since, the L returned by algorithm in FIG. 5 is much lower than 7—which is the aggregation granularity for SC—and the inaccuracies in the estimates of the aggregated targets for these two cases are only slight.

The techniques presented in the disclosure improve prediction quality with the help of accurate aggregate or coarser information. In cases where there are (estimates of) aggregated targets at multiple levels, a method of choosing the optimal level so as to maximize the improvement in prediction quality is provided. The present disclosure also provides an algorithm for the same, in standard machine learning settings where aggregate information may not be available from an independent source. Moreover, using estimates of the moments of the target distribution, a method is presented of better distributing the aggregate information so as to further enhance the predictive accuracy.

In another embodiment, it may be desirable to choose multiple levels rather than just a single level and use the corresponding aggregated targets. Moreover, when the data is unordered one could first cluster the data and then apply the suggested algorithms to further enhance the predictive power.

The following illustrates proofs of the above lemmas.

Proof of Lemma 1 Proof. Consider two sets of N real numbers $X=\{x_1, x_2, \ldots, x_N\}$ and $\bar{X}=\{\bar{x}_1, \bar{x}_2, \ldots, \bar{x}_N\}$ (estimates). Let $A=\{a_1, \ldots, a_m\}$ and $\bar{A}=\{\bar{a}_1, \ldots, \bar{a}_m\}$ where if k is the aggregation granularity, $l_i=\min(ik,N)-(i-1)k-1$, $$m = \left\lceil \frac{N}{k} \right\rceil, \text{ then } a_i = \sum_{j=(i-1)k+1}^{\min(ik,N)} x_j \text{ and } \bar{a}_i = \sum_{j=(i-1)k+1}^{\min(ik,N)} \bar{x}_j.$$

Let $$\varepsilon_i = a_i - \bar{a}_i \text{ and } \hat{x}_j = \bar{x}_j + \frac{\varepsilon_{\lceil \frac{i}{k} \rceil}}{l_{\lceil \frac{j}{k} \rceil}}.$$

Let the mean squared error based on the original estimates i.e. ($\bar{x}_i$) be given by, $$MSE_{old} = \frac{1}{N} \sum_{i=1}^{N} (x_i - \bar{x}_i)^2 \qquad (3)$$

Hence, the mean squared error based on new estimates i.e. ($\hat{x}_i$) is given by, $$MSE_{new} = \frac{1}{N} \sum_{i=1}^{N} (x_i - \hat{x}_i)^2 \qquad (4)$$

$$= \frac{1}{N} \sum_{i=1}^{N} \left( (x_i - \bar{x}_i) - \frac{\varepsilon_{\lceil \frac{i}{k} \rceil}}{l_{\lceil \frac{i}{k} \rceil}} \right)^2$$

$$= \frac{1}{N} \sum_{i=1}^{N} (x_i - \bar{x}_i)^2 - \frac{1}{N}$$

$$\left[ \sum_{i=1}^{N} \left( \frac{2}{l_{\lceil \frac{i}{k} \rceil}} (x_i - \bar{x}_i) \varepsilon_{\lceil \frac{i}{k} \rceil} - \frac{1}{l_{\lceil \frac{i}{k} \rceil}^2} \left( \varepsilon_{\lceil \frac{i}{k} \rceil} \right)^2 \right) \right]$$

$$= MSE_{old} - \frac{1}{N} A$$

where $A = \sum_{i=1}^{N} \left( \frac{2}{l_{\lceil \frac{i}{k} \rceil}} (x_i - \bar{x}_i) \varepsilon_{\lceil \frac{i}{k} \rceil} - \frac{1}{l_{\lceil \frac{i}{k} \rceil}^2} \left( \varepsilon_{\lceil \frac{i}{k} \rceil} \right)^2 \right).$ Now to prove our result we have to show that $A \geq 0$.

$$A = \sum_{i=1}^{N} \left( \frac{2}{l_{\lceil \frac{i}{k} \rceil}} (x_i - \bar{x}_i) \varepsilon_{\lceil \frac{i}{k} \rceil} - \frac{1}{l_{\lceil \frac{i}{k} \rceil}^2} \left( \varepsilon_{\lceil \frac{i}{k} \rceil} \right)^2 \right) \qquad (5)$$

$$= \sum_{p=1}^{\lceil \frac{N}{k} \rceil} \left( \frac{2}{l_p} \left( \sum_{i=(p-1)k+1}^{\min(pk,N)} x_i - \sum_{i=(p-1)k+1}^{\min(pk,N)} \bar{x}_i \right) \varepsilon_p - \frac{1}{l_p^2} l_p \varepsilon_p^2 \right)$$

-continued $$= \sum_{p=1}^{\lceil \frac{N}{k} \rceil} \left( \frac{2}{l_p} \varepsilon_p^2 - \frac{1}{l_p} \varepsilon_p^2 \right)$$

$$= \sum_{p=1}^{\lceil \frac{N}{k} \rceil} \frac{1}{l_p} \varepsilon_p^2 \geq 0$$

Proof of Theorem 1 Proof. The proof of the theorem follows from the proof of lemma 1 where we substitute $\epsilon_i$ with $\delta_i \in [0, 2\epsilon_i]$ in equation (4). With this we have, $$MSE_{new} = MSE_{old} - \frac{1}{N} B \quad (6)$$

$$\text{where } B = \sum_{i=1}^{N} \left( \frac{2}{l_{\lceil \frac{i}{k} \rceil}} (x_i - \bar{x}_i) \delta_{\lceil \frac{i}{k} \rceil} - \frac{1}{l_{\lceil \frac{i}{k} \rceil}^2} \left( \delta_{\lceil \frac{i}{k} \rceil} \right)^2 \right).$$

Now to prove our result we have to show that B≥0.

$$B = \sum_{i=1}^{N} \left( \frac{2}{l_{\lceil \frac{i}{k} \rceil}} (x_i - \bar{x}_i) \delta_{\lceil \frac{i}{k} \rceil} - \frac{1}{l_{\lceil \frac{i}{k} \rceil}^2} \left( \delta_{\lceil \frac{i}{k} \rceil} \right)^2 \right) \quad (7)$$

$$= \sum_{p=1}^{\lceil \frac{N}{k} \rceil} \left( \frac{2}{l_p} \left( \sum_{i=(p-1)k+1}^{\min(pk,N)} x_i - \sum_{i=(p-1)k+1}^{\min(pk,N)} \bar{x}_i \right) \delta_p - \frac{1}{l_p^2} l_p \delta_p^2 \right)$$

$$= \sum_{p=1}^{\lceil \frac{N}{k} \rceil} \left( \frac{2}{l_p} \delta_p \varepsilon_p - \frac{1}{l_p} \delta_p^2 \right)$$

$$= \sum_{p=1}^{\lceil \frac{N}{k} \rceil} \frac{-1}{l_p} \delta_p (\delta_p - 2\varepsilon_p)$$

The above quadratic equation has 2 roots $\delta_p = 0$ and $\delta_p = 2\epsilon_p$ and we already know that B≥0 when $\delta_p = \epsilon_p$. Since, $\epsilon_p \in [0, 2\epsilon_p]$ and the function is a quadratic in $\delta_p$ we have B≥0 $\forall \delta_p \in [0, 2\epsilon_p]$.

Proof of Lemma 2 Proof. In equation (5) substituting the alphas we have, $$A = \sum_{p=1}^{\lceil \frac{N}{k} \rceil} 2\varepsilon_p \sum_{i=(p-1)k+1}^{\min(pk,N)} \left[ (x_i - \bar{x}_i)\alpha_i - \frac{\varepsilon_p}{2} \alpha_i^2 \right] \quad (8)$$

We thus have to show that when all alphas for a particular p are not equal then there always exist X and $\bar{X}$ such that A<0. We can show this by proving that there always exist $\{x_{(p-1)k+1}, \ldots, x_{min(pk,N)}\}$ and $\{\bar{x}_{(p-1)k+1}, \ldots, \bar{x}_{min(pk,N)}\}$ such that the above equation for any particular p is less than zero and hence, if we replicate this case for all p then their sum is less than zero which implies A<0. With this we have to show that for any p (in our setting), $$2\varepsilon_p \sum_{i=(p-1)k+1}^{\min(pk,N)} \left[ (x_i - \bar{x}_i)\alpha_i - \frac{\varepsilon_p}{2} \alpha_i^2 \right] \leq 0.$$

Without loss of generality (w.l.o.g.) we will prove the above result for p=1 and the proof should be valid for all p. Hence, we will show that when all alphas for p=1 are not equal then there always exist $\{x_1, \ldots, x_k\}$ and $\{\bar{x}_1, \ldots, \bar{x}_k\}$ such that, $$2\varepsilon_1 \sum_{i=1}^{k} \left[ (x_i - \bar{x}_i)\alpha_i - \frac{\varepsilon_1}{2} \alpha_i^2 \right] \leq 0.$$

Since all alphas are not equal, w.l.o.g. assume that $\alpha_1 > \alpha_2$ where $\alpha_1 \geq \alpha_i \forall i \in \{1, \ldots, k\}$ and $\alpha_2 \leq \alpha_i \forall i \in \{1, \ldots k\}$. We will prove the result by dividing it into 2 cases. Case 1 is $\epsilon_1 \geq 0$ and case 2 is $\epsilon_1 \leq 0$. Notice that we have freedom to choose values for X and $\bar{X}$ to prove our result.

Case 1: We choose $x_i$ and $\bar{x}_i$ such that $x_i = \bar{x}_i \forall i \in \{3, \ldots, k\}$ and $x_2 - \bar{x}_2 \geq \bar{x}_1 - x_1 \geq 0$. This forces $\epsilon_1 \geq 0$ as desired. Hence, for the previous equation to be true, a sufficient condition is $\alpha_1(x_1 - \bar{x}_1) + \alpha_2(x_2 - \bar{x}_2) \leq 0$ which implies $$\bar{x}_1 - x_1 \geq \frac{\alpha_2}{\alpha_1}(x_2 - \bar{x}_2).$$

We can always find $x_1, \bar{x}_1, x_2$ and $\bar{x}_2$ such that $$x_2 - \bar{x}_2 \geq \bar{x}_1 - x_1 \geq \frac{\alpha_2}{\alpha_1}(x_2 - \bar{x}_2) \geq 0 \,\forall\, \alpha_i$$

where $i \in \{1, \ldots k\}$.

Case 2: This is analogous to case 1. All the inequalities in case 1 can be reversed and hence, we need to find $x_1, \bar{x}_1, x_2$ and $\bar{x}_2$ such that $$x_2 - \bar{x}_2 \leq \bar{x}_1 - x_1 \leq \frac{\alpha_2}{\alpha_1}(x_2 - \bar{x}_2) \leq 0 \,\forall\, \alpha_i$$

where $i \in \{1, \ldots, k\}$, which is definitely possible.

Proof of Lemma 3 Proof. Since we take expectations with respect to the underlying distribution for the result of this lemma the objective we have to maximize to get the optimal alphas is the expected value of equation (8) given $a_p$ and $\bar{a}_p$, i.e. $E[A | a_p, \bar{a}_p]$. This function is concave in the alphas and hence by forming the lagrangian and maximizing the objective given the constraints on the alphas we get, $$\lambda = \frac{-2}{l_p}(2l_p - 1)(\sigma^2 + \mu^2),$$

$i \neq l_p$ and $$\alpha_p^{(i)} = \frac{1}{2\varepsilon_p^2}[2\varepsilon_p(\mu - \bar{x}_{i+k(p-1)} + \lambda)];$$

where $\lambda$ is the lagrange parameter. Notice that $\alpha_p^{(l_p)}$ is uniquely defined since the alphas sum to 1. With this the optimal alphas are given by, $$\alpha_p^{(i)} = \frac{1}{l_p \varepsilon_p^2} [l_p \varepsilon_p (\mu - \bar{x}_{i+k(p-1)}) - (2l_p - 1)(\sigma^2 + \mu^2)];$$

$i \neq l_p$ and $$\alpha_p^{(l_p)} = \frac{1}{l_p \varepsilon_p^2} [(2l_p - 1)(l_p - 1)(\sigma^2 + \mu^2) - l_p \varepsilon_p ((l_p - 1)\mu + \bar{x}_{i+k(p-1)} - a_p)]$$

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The systems and methodologies of the present disclosure may be carried out or executed in a computer system that includes a processing unit, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen for presenting output displays and providing a display through which the user may input data and interact with the processing system, for instance, in cooperation with input devices such as the keyboard and mouse device or pointing device. The computer processing system may be also connected or coupled to one or more peripheral devices such as the printer, scanner, speaker, and any other devices, directly or via remote connections. The computer processing system may be connected or coupled to one or more other processing systems such as a server, other remote computer processing system, network storage devices, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

I claim:

1. A method for improving predictions of a given predictive model using aggregate information, comprising:
   identifying a plurality of targets to predict in a given domain;
   receiving raw data set for predicting a plurality of values associated respectively with the plurality of targets in the given domain and predicting the plurality of values;
   receiving aggregate information associated with the plurality of targets, the aggregate information including estimated or actual values at a coarser level of the plurality of targets; and
   improving, by a processor, the predicted values of the plurality of targets based on the aggregate information, wherein the improving comprises:
   summing the plurality of values to determine an aggregated value;
   subtracting the aggregated value from the aggregate information to determining a corresponding difference;
   dividing the corresponding difference by a count of the plurality of targets to determine a factor; and adding the factor to each of the plurality of values, wherein the plurality of values with the added factor represents the improved predicted values of the plurality of targets.

2. The method of claim 1, further including:
receiving distributional information associated with the predicted values of the plurality of targets; and
the improving step includes improving, by the processor, the predicted values by incorporating the distributional information.

3. The method of claim 1, wherein in response to determining that there exists multiple aggregate information at different levels of granularity, selecting based on a criterion the aggregate information at a level of granularity that is determined to improve the predicted values of the plurality of targets most optimally.

4. The method of claim 3, wherein the criterion includes $$L = \min_k \text{argmin}_k k MSE_k$$

wherein k is the aggregation granularity and MSE is mean square error at k-th level of aggregation granularity.

5. The method of claim 1, wherein in response to determining that the aggregate information is not available, building one or more regression models to estimate the aggregate information at one or more levels of granularity, respectively.

6. The method of claim 5, further wherein the aggregate information is selected from the estimated aggregate information at one or more levels of granularity, based on a criterion.

7. A computer readable storage medium storing a program of instructions executable by a machine to perform a method of improving predictions of a given predictive model using aggregate information, comprising:
identifying a plurality of targets to predict in a given domain;
receiving raw data set for predicting a plurality of values associated respectively with the plurality of targets in the given domain and predicting the plurality of values;
receiving aggregate information associated with the plurality of targets; and
improving, by a processor, the predicted values of the plurality of targets based on the aggregate information, wherein the improving comprises:
summing the plurality of values to determine an aggregated value;
subtracting the aggregated value from the aggregate information to determining a corresponding difference;
dividing the corresponding difference by a count of the plurality of targets to determine a factor; and
adding the factor to each of the plurality of values, wherein the plurality of values with the added factor represents the improved predicted values of the plurality of targets.

8. The computer readable storage medium of claim 7, further including:
receiving distributional information associated with the predicted values of the plurality of targets; and
the improving step includes improving, by the processor, the predicted values by incorporating the distributional information.

9. The computer readable storage medium of claim 7, wherein in response to determining that there exists multiple aggregate information at different levels of granularity, selecting based on a criterion the aggregate information at a level of granularity that is determined to improve the predicted values of the plurality of targets most optimally.

10. The computer readable storage medium of claim 9, wherein the criterion includes $$L = \min_k \text{argmin}_k k MSE_k$$

wherein k is the aggregation granularity and MSE is mean square error at k-th level of aggregation granularity.

11. The computer readable storage medium of claim 7, wherein in response to determining that the aggregate information is not available, building one or more regression models to estimate the aggregate information at one or more levels of granularity, respectively.

12. The computer readable storage medium of claim 11, further wherein the aggregate information is selected from the estimated aggregate information at one or more levels of granularity, based on a criterion.

13. A system for improving predictions of a given predictive model using aggregate information, comprising:
a processor;
a module operable to execute on the processor and further operable to identify a plurality of targets to predict in a given domain, the module further operable to receive raw data set for predicting a plurality of values associated respectively with the plurality of targets in the given domain and predicting the plurality of values, the module further operable to receive aggregate information associated with the plurality of targets, the aggregate information including estimated or actual values at a coarser level of the plurality of targets, the module further operable to improve the predicted values of the plurality of targets based on the aggregate information,
wherein the module improves the predicted values by:
summing the plurality of values to determine an aggregated value;
subtracting the aggregated value from the aggregate information to determining a corresponding difference;
dividing the corresponding difference by a count of the plurality of targets to determine a factor; and
adding the factor to each of the plurality of values, wherein the plurality of values with the added factor represents the improved predicted values of the plurality of targets.

14. The system of claim 13, wherein the module is further operable to receive distributional information associated with the predicted values of the plurality of targets; and the module further improves the predicted values by incorporating the distributional information.

15. The system of claim 13, wherein in response to determining that there exists multiple aggregate information at different levels of granularity, the module is further operable to select based on a criterion the aggregate information at a level of granularity that is determined to improve the predicted values of the plurality of targets most optimally.

16. The system of claim 15, wherein the criterion includes $$L = \min_k \text{argmin}_k k MSE_k$$

wherein k is the aggregation granularity and MSE is mean square error at k-th level of aggregation granularity.

17. The system of claim 13, wherein in response to determining that the aggregate information is not available, the module is further operable to build one or more regression models to estimate the aggregate information at one or more levels of granularity, respectively.

18. The system of claim 17, wherein the aggregate information is selected from the estimated aggregate information at one or more levels of granularity, based on a criterion.

* * * * *